(12) United States Patent
Johansson et al.

(10) Patent No.: US 12,240,044 B2
(45) Date of Patent: Mar. 4, 2025

(54) TURNING INSERT FOR METAL CUTTING

(71) Applicant: AB SANDVIK COROMANT, Sandviken (SE)

(72) Inventors: Adam Johansson, Sandviken (SE); Ronnie Lof, Sandviken (SE); Joe Truong, Sandviken (SE)

(73) Assignee: AB Sandvik Coromant, Sandviken (SE)

( * ) Notice: Subject to any disclaimer, the term of this patent is extended or adjusted under 35 U.S.C. 154(b) by 603 days.

(21) Appl. No.: 17/433,778

(22) PCT Filed: Feb. 3, 2020

(86) PCT No.: PCT/EP2020/052555
§ 371 (c)(1),
(2) Date: Aug. 25, 2021

(87) PCT Pub. No.: WO2020/173663
PCT Pub. Date: Sep. 3, 2020

(65) Prior Publication Data
US 2022/0347760 A1 Nov. 3, 2022

(30) Foreign Application Priority Data
Feb. 28, 2019 (EP) .................................... 19159960

(51) Int. Cl.
*B23B 27/16* (2006.01)
*B23B 27/14* (2006.01)

(52) U.S. Cl.
CPC ...... *B23B 27/145* (2013.01); *B23B 2200/081* (2013.01); *B23B 2200/201* (2013.01); *B23B 2200/321* (2013.01)

(58) Field of Classification Search
CPC ........ B23B 2200/165; B23B 2200/204; B23B 2200/28; B23B 2200/32; B23B 2200/321;
(Continued)

(56) References Cited

U.S. PATENT DOCUMENTS 4,189,265 A 2/1980 Arnold et al.
4,632,608 A 12/1986 Blomberg et al.
(Continued)

FOREIGN PATENT DOCUMENTS

EP 1669146 A1 6/2006
EP 2873462 A1 5/2015
(Continued)

*Primary Examiner* — Alan Snyder
(74) *Attorney, Agent, or Firm* — Corinne R. Gorski

(57) ABSTRACT

A turning insert includes a top surface, a bottom surface, and side surfaces connecting the top and bottom surfaces. A reference plane is located parallel to and between the top surface and the bottom surface. A center axis intersects and extends perpendicular to the reference plane. Three nose portions are formed symmetrically around the center axis. Each nose portion has a first cutting edge, a second cutting edge and a convex nose cutting edge connecting the first and second cutting edges. As seen in in a top view, the first and second cutting edges on the same nose portion form a nose angle of 25-50°. The first cutting edge includes a first sub-portion and a second sub-portion. A distance from the nose cutting edge to the first sub-portion is shorter than a distance from the nose cutting edge to the second sub-portion.

14 Claims, 6 Drawing Sheets

(58) Field of Classification Search
CPC ............ B23B 2200/049; B23B 27/005; B23B 27/141; B23B 27/143; B23B 27/1618; B23B 27/1622; B23B 27/1603; B23B 27/1614; B23B 27/1625; B23B 27/1637; B23B 27/164; B23B 27/1644; B23B 27/1648; B23B 27/1651; B23B 27/1659; B23B 27/1666; B23B 27/1677

See application file for complete search history.

(56) References Cited

U.S. PATENT DOCUMENTS

| | | | |
|---|---|---|---|
| 5,203,649 A | 4/1993 | Katbi et al. | |
| 5,810,518 A | 9/1998 | Wiman et al. | |
| 10,099,294 B2 | 10/2018 | Furusawa | |
| 10,994,342 B2 | 5/2021 | Ida et al. | |
| 2003/0025020 A1 | 2/2003 | Britzke | |
| 2003/0213861 A1 | 11/2003 | Condon et al. | |
| 2012/0128438 A1* | 5/2012 | Tanaka | B23B 27/141 407/115 |
| 2013/0236258 A1* | 9/2013 | Nada | B23B 27/1607 407/114 |
| 2017/0100776 A1* | 4/2017 | Lof | B23B 27/1644 |
| 2017/0100777 A1* | 4/2017 | Lof | B23B 27/1651 |
| 2017/0209935 A1* | 7/2017 | Furusawa | B23B 27/045 |
| 2019/0047061 A1* | 2/2019 | Ida | B23B 27/1622 |

FOREIGN PATENT DOCUMENTS

| | | |
|---|---|---|
| EP | 3153260 A1 | 4/2017 |
| JP | S6175908 U | 5/1986 |
| JP | S6312882 U | 1/1988 |
| JP | H07308807 A | 11/1995 |
| JP | 2018530445 A | 4/2017 |
| KR | 1020140075462 | 12/2015 |
| WO | 2016206753 A1 | 12/2016 |

\* cited by examiner

TURNING INSERT FOR METAL CUTTING

RELATED APPLICATION DATA

This application is a § 371 National Stage Application of PCT International Application No. PCT/EP2020/052555 filed Feb. 3, 2020 claiming priority to EP 19159960.4 filed Feb. 28, 2019.

TECHNICAL FIELD OF THE INVENTION

The present invention belongs to the technical field of metal cutting. More specifically the present invention belongs to the field of turning inserts used for metal cutting in machine tools such as CNC-machines.

BACKGROUND OF THE INVENTION AND PRIOR ART

The present invention refers to a turning insert according to the preamble of claim 1, a turning tool comprising such turning insert, and a method to machine a metal work piece using such turning tool. In other words, the present invention relates to a turning insert comprising a top surface, an opposite bottom surface, side surfaces connecting the top surface and the bottom surface, a reference plane located parallel to and between the top surface and the bottom surface, a center axis extending perpendicular to the reference plane and intersecting the reference plane, three nose portions formed symmetrically around the center axis, each nose portion comprising a first cutting edge, a second cutting edge and a convex nose cutting edge connecting the first and second cutting edges, wherein in a top view the first and second cutting edges on the same nose portion forms a nose angle relative to each other.

In turning of a metal work piece, the metal work piece rotates around a center axis. The metal work piece is clamped at one end by rotatable clamping means such as one or more chuck or jaws. The end of the work piece which is clamped can be called a clamping end or a driving end. For stable clamping, the clamping end or the driving end of the metal work piece may have a larger diameter than the opposite end of the metal work piece and/or has a larger diameter of a portion of the metal work piece located between the clamping end and the opposite end. Alternatively, the metal work piece may have a constant diameter before a machining, i.e. metal cutting, operation. The turning insert is moved in relation to the metal work piece. This relative movement is called feed. The movement of the turning insert can be in a direction parallel to the center axis of the metal work piece, this is commonly called longitudinal feed or axial feed. The movement of turning insert can furthermore be in a direction perpendicular to the center axis of the metal work piece, this is commonly called radial feed or facing. Other angles of movement, or feed directions, are also possible, this is commonly known as copying or copy-turning. In copying, the feed has both axial and radial components. During the relative movement of the turning insert, material from the metal work piece is removed in the form of chips. The chips are preferably short and/or have a shape or direction of movement which prevents chip jamming and/or do not give a poor surface finish of the machined surface.

A common shape of turning insert which can be used for a wide range of feed direction is the triangular turning insert. Such insert has in a top view, i.e. a rake face towards the viewer, the shape of a triangle where all three sides are of equal length and where the nose angle is 60°. The corners of the triangle are in the form of nose cutting edges, which typically has a radius of curvature in the range of 0.2-2.0 mm. Examples of such turning inserts are commonly designated TNMG and TCMT according to ISO standard, and are commonly made at least partly from coated or uncoated cemented carbide or cubic boron nitride (CBN) or ceramic or cermet.

In radial turning, the feed direction is perpendicular to and towards the rotational axis of the metal work piece. This is called facing. Although radial turning away from the rotational axis of the metal work piece, also known as out-facing, may be advantageous when machining certain components, using common turning inserts such as TNMG or TCMT give disadvantages, such as poor chip control.

The turning inserts in U.S. Pat. No. 4,632,608 is intended to overcome drawbacks in out-facing. The insert comprises three nose portions. In one embodiment, the nose portion has a circular shape. A portion of the circular shaped cutting edge is the only active cutting edge in out-facing. In a further embodiment the periphery of each nose portion consists of a number of cambered segments, where the nose angle is 60°. For this embodiment, in out-facing, a portion of a straight cutting edge and a portion of a convexly curved nose cutting edge is the only active cutting edge in out-facing. The turning inserts in U.S. Pat. No. 4,632,608 can be used for machining two walls forming an external 90° corner in a metal work piece, where one wall, at a greater distance from the rotational axis, is perpendicular to the rotational axis and one cylindrical wall, at a smaller distance from the rotational axis, is parallel to the rotational axis, where the two walls are connected by a circular or curved segment. An external 90° corner in this context is a 90° corner formed on or at an external or outer surface of a metal work piece, such that the cylindrical wall or cylindrical surface is facing away from the rotational axis. This is in contrast to any corner which may be formed on or at an internal or inner surface inside a bore concentric with the rotational axis.

The circular or curved segment is in a cross section in a plane comprising the rotational axis in the shape of an arc, in the shape of a quarter of a circle or a quarter of a shape which is substantially a circle, which has the same radius of curvature as the nose cutting edge of the turning insert. The circular or curved segment alternatively has a greater radius of curvature than the nose cutting edge of the turning insert. More specifically, in U.S. Pat. No. 4,632,608, the machining of the two walls forming an external 90° corner is made by an axial turning operation followed by an out-facing operation, where the same portion of the active nose portion is active in both operations. In the above-mentioned axial turning operation, which is towards the clamping end of the metal work piece and towards the wall of the corner which is perpendicular to the rotational axis of the metal work piece.

In EP3153260A1, it is said that chip control is reduced as the turning insert is moved closer to above mentioned wall which extends perpendicular to the rotational axis at a greater distance from rotational axis.

In EP3153260A1, an alternative way to machine two wall surfaces forming an external 90° corner in a metal work piece is found to be more effective with regards to insert wear and/or chip breaking and/or chip control, and that a new turning insert gives further improvements compared to previously known turning inserts.

SUMMARY OF THE INVENTION

The inventors have found that the chip breaking in EP3153260A1 can be improved.

An object of the present invention is to provide a turning insert comprising three nose portions, suitable for economic machining of two wall surfaces forming an external 90° corner in a metal work piece, which has improved chip breaking when machining at an entering angle between 10° and 45°.

This object is achieved with the initially defined turning insert, which is characterized in that the first cutting edge comprises a first sub-portion and a second sub-portion, wherein a distance from the nose cutting edge to the first sub-portion is shorter than a distance from the nose cutting edge to the second sub-portion, wherein a distance from the first sub-portion to the reference plane decreases at increasing distance from the nose cutting edge, wherein a distance from the second sub-portion to the reference plane increases at increasing distance from the nose cutting edge, and wherein the bottom surface comprises rotation prevention means.

The top surface comprises a rake face. The bottom surface comprises a seating surface. The reference plane is parallel to a plane in which the nose cutting edges are located. The nose cutting edges are preferably the cutting edges which are located at a greatest distance from the reference plane. The nose cutting edges are located at equal distances from the center axis. The center axis passes through a geometrical center of the insert. Preferably the center axis is in the center of a through hole for a clamping screw. The nose portions are formed symmetrically around the center axis, i.e. each nose portion form an angle of 120° relative to each other nose portion. A nose portion is a distal portion of the turning insert, in relation to the center of the turning insert. At least a portion of one nose portion is active, i.e. is in contact with the metal work piece, during machining. Each nose portion comprises cutting edges at least adjacent to or bordering to the top surface. The turning insert may be double-sided or reversible, i.e. the bottom surface comprises a similar or identical set of cutting edges as the top surface. The nose cutting edges form the most distal portions of the turning insert, in other words, the nose cutting edges are the parts of the cutting insert which are located at the greatest distance from the center axis of the turning insert. A nose portion is a peripheral portion of the cutting insert where a rake face is formed on or at the top surface between the first, second and nose cutting edges. The nose cutting edge preferably has the shape of an arc or a portion of a circle having its center between the first and second cutting edge, wherein the circle preferably has a radius of 0.2-2.0 mm. Alternatively, the nose cutting edge may have the shape of an arc of an ellipse. Alternatively, the nose cutting edge may have a shape of a combination of one or more arcs of circles or arcs of ellipses as well as straight portions, which together form a nose cutting edge which is convex in a top view. A top view is a view in which the top surface is facing the viewer and the bottom surface is facing away from the viewer. The first and second cutting edges are preferably straight in a top view. If the first and second cutting edges are not straight in a top view, such as for example slightly convex or slightly concave, the nose angle is measured using straight lines between the end points of the first and second cutting edges respectively. If the first and second edges are slightly convex or slightly concave, the radius of curvature for the first and second cutting edges are more than 5 times, and preferably more the 10 times, greater than the radius of curvature for the nose cutting edge. Alternatively, a nose angle of 25-50° is equal to a nose cutting edge having the shape of a circular arc of an angle of 25-50°. All nose cutting edges are preferably located in a common plane parallel to the reference plane. A cutting edge is an edge of the turning insert which borders to a rake face and a clearance surface, also known as a relief surface. The arc length of the nose cutting edge is shorter than both the length of the first cutting edge and the second cutting edge. Preferably the turning insert is single-sided in such a way that the area of the top surface is greater than the area of the bottom surface, where both the top and bottom areas are projected on the reference plane RP. The turning insert is preferably made at least partially from a piece of coated or uncoated sintered cemented carbide or cermet. Alternatively, the turning insert may be made at least partially from cubic boron nitride (CBN), poly crystalline diamond (PCD) or ceramic. The turning insert is mountable in a removable manner in a tool body, by means of e.g. a screw or a clamp. Preferably, a through-hole extends between the top and bottom surfaces.

Preferably, the first sub-portion slopes at an angle of 1-5°, even more preferably 2-4°. The first sub-portion slopes downwards in a side view, i.e. towards the reference plane, away from the nose cutting edge. Preferably, the second sub-portion slopes at an angle of 1-5°, even more preferably 2-4°. The second sub-portion slopes upwards in a side view, i.e. away from the reference plane, in a direction away from the nose cutting edge.

Preferably, the length, seen in a top view, of the first sub-portion is 1.0-6.0 mm, even more preferably 1.5-4.0 mm. Preferably, the length, seen in a top view, of the second sub-portion is 1.0-6.0 mm, even more preferably 1.5-4.0 mm. Preferably, the length of the first cutting edge, seen in a top view, is 2.5-10.0 mm. Preferably, the length of the first cutting edge, seen in a top view, is 10-40% of a distance between two nose cutting edges.

The bottom surface comprises rotation prevention means. By such a turning insert, the radial turning in opposite directions and/or axial turning in opposite directions is improved when turning insert is seated in the tool body. Further, the seating of the insert is improved, which reduces the need for side surfaces functioning as contact surfaces. Thereby, the versatility of a turning tool with regards to feed directions can be improved. The rotation prevention means can be in the form of one or more ridges, grooves, protrusions or cavities, or a combination of such features. The rotation prevention means are suitable for interacting by contact with a corresponding structure in a tool body or a shim seated in a tool body, in which the turning insert can be removably clamped. The rotation prevention means prevents or at least reduces rotation or movement of the turning insert in two opposite directions around the center axis of the turning insert.

According to an embodiment, the first cutting edge comprises a third sub-portion, wherein the third sub-portion is between the first sub-portion and the second sub-portion, wherein the third sub-portion is concave in a side view.

According to an embodiment, third sub-portion is the lowest portion of the first cutting edge in a side view.

In other words, a distance from the reference plane to the third sub portion is shorter than a distance from the reference plane to all other portions of the first cutting edge.

According to an embodiment, the rotation prevention means are in the form of three grooves, each groove having a main extension along the bisector located between adjacent first and second cutting edges.

By such a turning insert, the insert is indexable in three positions in the same insert seat. The orientation of the groove is oriented symmetrically in relation to the first and second cutting edges in a way such that there is sufficient rotation prevention both in axial turning in opposite directions and in radial turning in opposite directions (facing and out-facing). In other words, for each nose portion the bisector located between the first and second cutting edges has the same extension as the main extension of the groove in the bottom surface of the insert in the same nose portion. Consequently, all three grooves have a main extension in a direction towards the center axis of the turning insert. Preferably, said an angle between a pair of grooves is 120° when seen in a bottom view where the reference plane is perpendicular to the view of the viewer.

According to an embodiment, the first and second cutting edges are linear or straight in a top view.

By such a turning insert, the cutting force direction and/or chip flow direction will be less dependent of the cutting depth, i.e. depth of cut. In this context, a concave or convex radius of curvature greater than 200 mm is considered straight or linear.

According to an embodiment, bisectors extends equidistantly from each pair of first and second cutting edges and wherein each bisector intersecting the center axis, and wherein the first and second cutting edges are symmetrical or substantially symmetrical relative to the bisector in respective side views.

By such a turning insert, the risk of interference by non-active nose cutting edges is reduced when machining in two directions which may be perpendicular. By such a turning insert, it is possible to use the insert for metal work pieces clamped at opposite ends. In other words, the first and the second cutting edge formed on or at the same nose portion are located at equal distance from the bisector. Thus, the bisector is located between the first and second cutting edges. The first and second cutting edges are located on or at opposite sides of the bisector. Each bisector forms an angle of 120° relative to any other bisector. Each bisector intersects the center axis. Each bisector intersects the center of the nose cutting edge formed on or at the same nose portion as the first cutting edge and the second cutting edge.

The first and second cutting edges are symmetrical or substantially symmetrical relative to the bisector in respective side views. In other words, the first and second cutting edges are symmetrical in relation to the bisector. Preferably, the nose portion is symmetrical in relation to the bisector. By such a turning insert, the insert can be used in a right-hand tool and a left-hand tool. Thus, an assortment of turning insert can be reduced.

According to an embodiment, bisectors extends equidistantly from each pair of first and second cutting edges and wherein each bisector intersecting the center axis, wherein the top surface comprises a protrusion having an extension along the bisector, the protrusion comprising a first chip breaker wall facing the first cutting edge and a second chip breaker wall facing the second cutting edge.

By such a turning insert, the chip breaking and/or chip control is further improved. One further effect is that there is a reduced risk that chips hit the machined surface, which can reduce the surface quality of the machined metal work piece, i.e. the component. The protrusion may extend further away from the reference plane than surrounding portions of the top surface. A rake face is formed between the protrusion and the cutting edges.

Preferably, the top surface of the turning insert is sunken between the first cutting edge and the first chip breaker wall. In other words, the top surface of the turning insert which is between the first cutting edge and the first chip breaker wall is located at a shorter distance from the reference plane, compared to adjacent portions of the first cutting edge and the first chip breaker wall. Adjacent portions in this context should be understood as portions along a line which is perpendicular to the first cutting edge in a top view.

The top surface comprises a protrusion having an extension along at least one of the bisectors.

According to an embodiment, the top surface comprises a second protrusion having an extension along the bisector, wherein the second protrusion is between the nose cutting edge and the protrusion, wherein in a side view, a top surface of the second protrusion is lower than a top surface of the protrusion.

By such a turning insert, the chip breaking is further improved, especially at low depth of cut, such as when only the nose cutting edge is active.

The second protrusion has an extension along the bisector. In other words, the second protrusion intersects the bisector in a top view. The second protrusion comprises a first chip breaker wall facing the first cutting edge and a second chip breaker wall facing the second cutting edge.

A distance from a top surface of the second protrusion to the reference plane is shorter than a distance from a top surface of the protrusion to the reference plane.

Preferably, a distance from the nose cutting edge to the reference plane is shorter than a distance from a top surface of the second protrusion to the reference plane.

Preferably, the second protrusion is U-shaped in a top view, where a convex portion of the second protrusion is facing the nose cutting edge. The concave portion is thus arc-shape or arc-like in a top view, where said arc is 150-220°.

According to an embodiment, a distance measured in a plane perpendicular to the reference plane between the top surface of the protrusion and the lowest point of the first cutting edge is 0.36-0.7 mm.

By such a turning insert, the chip breaking and/or chip control is further improved.

Said distance is in a side view. Preferably, said distance 61 is 0.40-0.55 mm. Said distance is measured to the top surface of the protrusion, which preferably is the highest point of the turning insert seen in a side view.

Preferably, the height of the protrusion is decreasing in a direction towards the nose cutting edge.

According to an embodiment, in a top view the distance from the second sub-portion to the first chip breaker wall is decreasing away from the nose cutting edge.

By such a turning insert, the chip breaking and/or chip control is further improved.

Formulated differently, a distance from an upper border line of the first chip breaker wall to the second sub-portion is decreasing in a direction away from the nose cutting edge. Said distance is measured in a direction perpendicular to the second sub-portion, in a top view. Preferably, and in a top view, an angle formed between an upper border line of the first chip breaker wall and the second sub-portion is 2-20°, even more preferably 5-15°. Said angle is measured in a top view.

According to an embodiment, a distance, measured in a plane perpendicular to the reference plane, between the nose cutting edge and the lowest point of the first cutting edge is 0.05-0.4 mm.

By such a turning insert, the chip breaking and/or chip control is further improved.

Said distance is in a side view. Preferably, said distance is 0.08-0.25 mm. Said distance is measured to the top surface of the protrusion, which preferably is the highest point of the turning insert seen in a side view.

According to an embodiment of the invention, the top and bottom surfaces are identical, wherein the rotation prevention means are in the form of a set of surfaces, each surface extending in a plane which forms an angle of 5-60° in relation to the reference plane.

By such a configuration, the turning insert can be made double-sided and comprise rotation prevention means. A double-sided, or reversible, turning insert means that the turning insert can be used with the prior bottom surface as rake face.

According to an embodiment of the invention, a turning tool comprises a turning insert according to the invention and a tool body, the tool body having a front end and an opposite rear end, a main extension along a longitudinal axis A2 extending from the front end to the rear end, an insert seat formed in the front end in which the turning insert is mountable such that a bisector of an active nose portion forms an angle θ of 35-55° in relation to the longitudinal axis A2 of the tool body.

By such a turning tool, the turning insert is positioned or seated in such a way that a larger range of feed directions are possible. By such a turning tool, for the same nose portion the first cutting edge can be used in axial turning and the second cutting edge can be used in out facing in such a way that there is a portion of the nose cutting edge that is inactive, i.e. no wear, for both operations, i.e. feed directions. By such a turning tool, an entering angle of the first cutting edge when axial turning away from the clamping end of the metal work piece is less than 45° and at least 10°. The inventors have found that such an entering angle give reduced insert wear when axial turning in such a way that the insert is moving in a direction away from the clamping end of the metal work piece. By such a turning tool, the entering angle of the second cutting edge when out facing, i.e. feeding perpendicularly away from the rotational axis of the metal work piece, is less than 45° and at least 10°. The inventors have found that such an entering angle give reduced insert wear when out facing. The active nose portion is the nose portion which in a mounted state comprises the nose cutting edge which in a top view is the part of the turning insert which is most distal in relation to the rear end of the tool body and in relation to the longitudinal axis of the tool body. The angle which the first cutting edge of the active nose portion forms in relation to the longitudinal axis of the tool body is greater than the angle which the second cutting edge of the active nose portion forms in relation to the longitudinal axis of the tool body. The longitudinal axis of the tool body is preferably perpendicular to the rotational axis of the metal work piece. The center axis of the turning insert in a mounted state is substantially perpendicular (70°-110°) in relation to the longitudinal axis of the tool body. The insert seat of the tool body preferably comprises insert rotation means which corresponds to the insert rotation means formed in the bottom surface of the turning insert. The rear end of the tool body is the part of the tool body which is located at the largest distance from the active nose cutting edge.

According to an embodiment of the invention, the sum of the angle θ and half the angle α is equal or greater than 50°, and equal or smaller than 70°. In other words, $50° \leq \theta + (\alpha/2) \leq 70°$.

By such a turning tool, the chip breaking and/or chip control is further improved in out-facing and in axial turning away from the clamping end of the metal work piece. By such a turning tool, a 90° external corner can be machined in the metal work piece, where one wall surface of the corner is perpendicular to the rotational axis of the metal work piece, and one wall surface of the corner is parallel to the rotational axis of the metal work piece, and where the two wall surfaces are connected by a surface having the same radius of curvature as the nose cutting edge of the turning insert. By such a turning tool, the entering angle of the first cutting edge is between 20° and 40°, when axial turning away from the clamping end of the metal work piece, and the inventors have found that such entering angle give reduced wear of the insert. By such a turning tool, the entering angle of the second cutting edge is between 20° and 40°, when out facing, and the inventors have found that such entering angle give reduced wear of the insert.

According to an embodiment of the invention, a method to machine a metal work piece is performed using a turning insert according to the invention. The method comprises the steps of clamping the metal work piece at a first end, rotating the metal work piece around a rotational axis A3, positioning the first cutting edge of an active nose portion such that the first cutting edge forms a smaller angle relative to the rotational axis A3 of the metal work piece than the angle formed by the second cutting edge relative to the rotational axis of the metal work piece, and moving the turning insert in a direction perpendicular to and away from the rotational axis A3 such that the second cutting edge is active. An active nose portion is the nose portion which is positioned such that during cutting, this nose portion comprises at least one cutting edge which cuts chips from the metal work piece. The active nose portion is positioned closer to the rotational axis of the metal work piece and closer to the first end of the metal work piece than the other, i.e. inactive, nose portions. The expression "the second cutting edge is active" means that the second cutting edge cuts chips from the metal work piece. Further, a portion of the nose cutting edge adjacent to the active second cutting edge is active. The first cutting edge, formed on or at the same nose portion as the second cutting edge, is inactive simultaneously as the second cutting edge is active. The moving of the turning insert is commonly known as feeding, alternatively out-facing. The second cutting edge is preferably active at a second entering angle κ2 of 20-40°. If the entering is less than 20°, the width of the chips would be too wide resulting in reduced chip control, and the risk of vibration would increase. If the entering angle is over 40°, the insert wear would increase.

According to an embodiment of the invention, a method to machine a metal work piece is performed using a turning insert according to the invention. The method comprises the steps of clamping the metal work piece at a first end, rotating the metal work piece around a rotational axis, positioning the first cutting edge of an active nose portion such that the first cutting edge forms a smaller angle relative to the rotational axis A3 of the metal work piece than the angle formed by the second cutting edge relative to the rotational axis of the metal work piece, and moving the turning insert in a direction parallel to the rotational axis A3 and away from the first end such that the first cutting edge is active. An active nose portion is the nose portion which is positioned such that during cutting, this nose portion comprises at least one cutting edge which cuts chips from the metal work piece. The active nose portion is positioned closer to the rotational axis of the metal work piece and closer to the first end of the metal work piece than the other, i.e. inactive, nose portions. The expression "the first cutting edge is active" means that the first cutting edge cuts chips from the metal work piece. Further, a portion of the nose cutting edge adjacent to the active first cutting edge is active. The second cutting edge, formed on or at the same nose portion as the first cutting edge, is inactive simultaneously as the first cutting edge is active. The moving of the turning insert is a longitudinal turning operation. The first cutting edge is preferably active at a first entering angle κ1 of 20-40°. If the entering is less than 20°, the width of the chips would be too wide resulting in reduced chip control, and the risk of vibration would increase. If the entering angle is over 40°, the insert wear would increase.

DESCRIPTION OF THE DRAWINGS

The present invention will now be explained in more detail by a description of different embodiments of the invention and by reference to the accompanying drawings.

DETAILED DESCRIPTION OF EMBODIMENTS OF THE INVENTION

Figure 1:
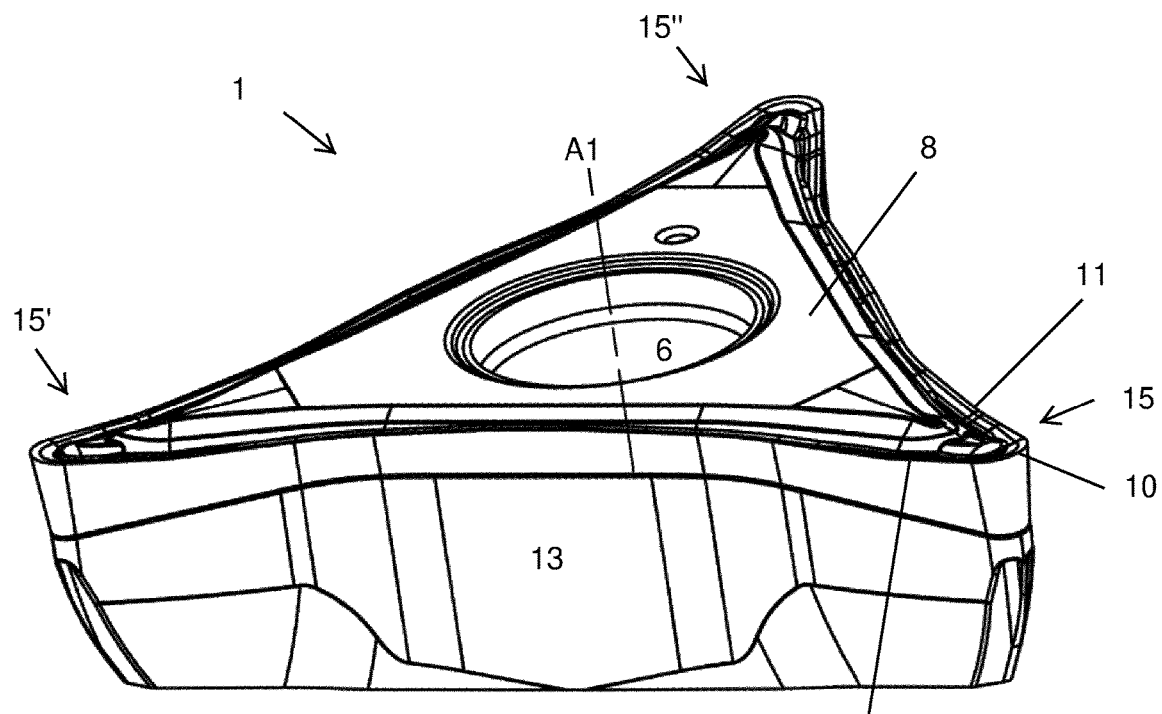
FIG. 1 is a perspective view showing a turning insert according to a first embodiment

Reference is made to FIGS. 1-3, 6, 9*a* and 9*b* describes a turning insert 1 according to a first embodiment. The turning insert 1 comprises a top surface 8, which comprises a rake face, and an opposite bottom surface 9, functioning as a seating surface. A reference plane RP is located parallel to and between the top surface 8 and the bottom surface 9. A center axis A1 extends perpendicular to the reference plane RP and intersects the reference plane RP, the top surface 8 and the bottom surface 9. A hole, for a screw, having openings in the top surface 8 and the bottom surface 9 is concentric with the center axis A1. The turning insert 1 comprises side surfaces 13, functioning as clearance surfaces, connecting the top surface 8 and the bottom surface 9.

Three nose portions 15, 15', 15" are formed symmetrically relative to or around the center axis A1. The nose portions 15, 15', 15" are identical. Each nose portion 15, 15', 15" comprises a first cutting edge 11, a second cutting edge 12 and a convex nose cutting edge 10 connecting the first 11 and second 12 cutting edges. The nose cutting edges 10, 10', 10" are located at a largest distance from the center axis A1, i.e. at a larger distance from the center axis A1 than all other parts of the turning insert. In a top view, seen in FIG. 3, the first 11 and second 12 cutting edges on or at the same nose portion 15 forms a nose angle α of 25-50° relative to each other, in FIG. 3 the nose angle α is 35°.

Figures 3, 4, 5:
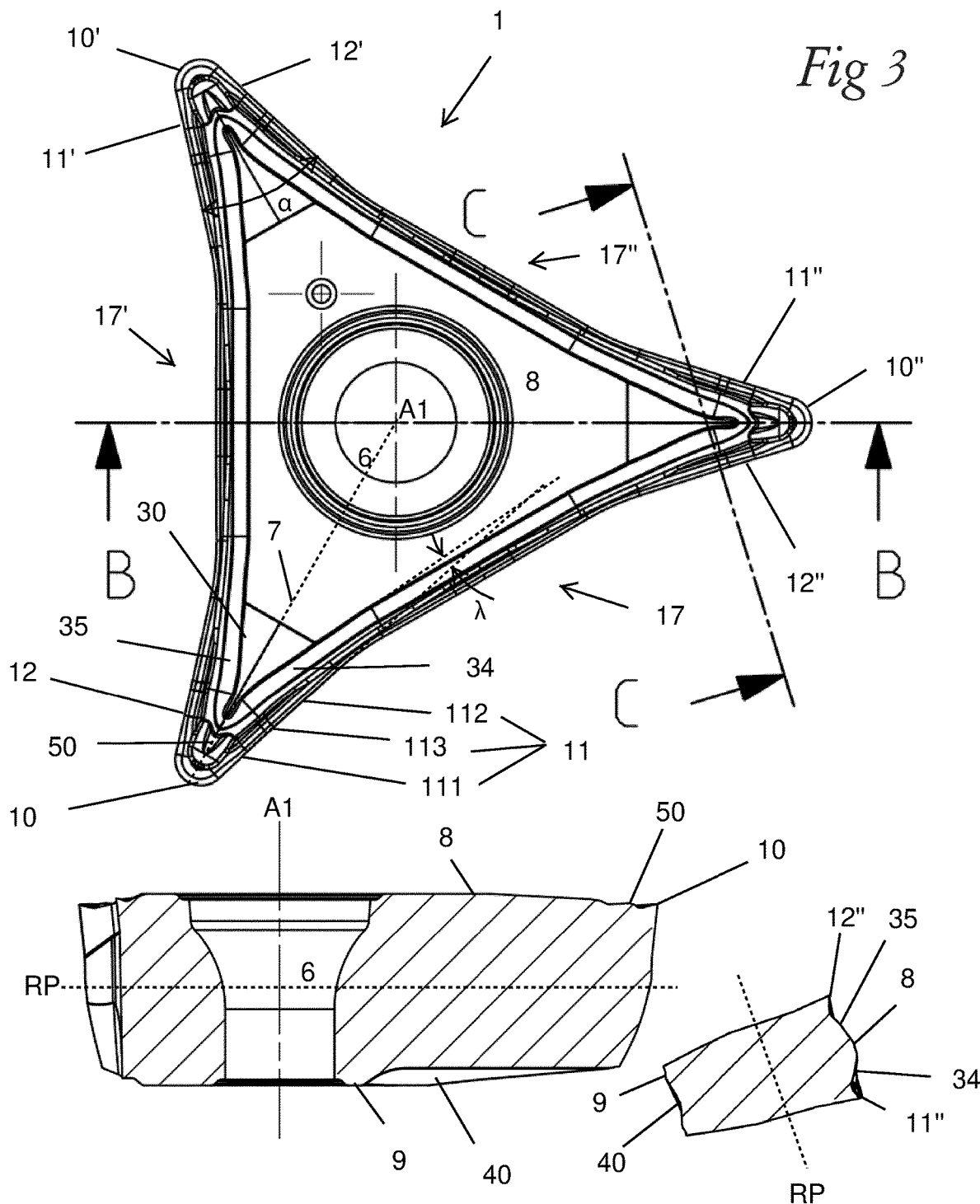
FIG. 3 is a top view or a front view of the turning insert in FIG. 1
FIG. 4 is section along the lines B-B in FIG. 3
FIG. 5 is section along the lines C-C in FIG. 3
Figure 6:
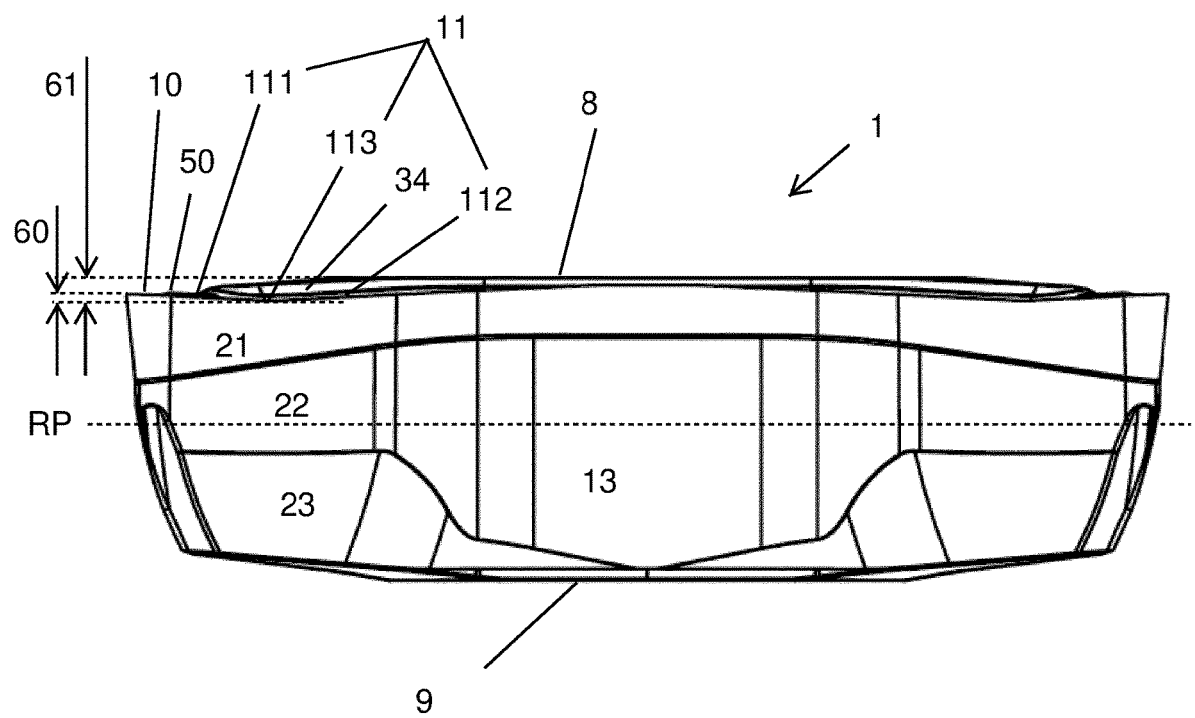
FIG. 6 is a side view of the turning insert in FIG. 1

The first and second cutting edges 11, 12 are linear or straight, or substantially linear or straight in a top view, as seen in FIG. 3. Bisectors 7 extend equidistantly from each pair of first 11, 11', 11" and second 12, 12', 12" cutting edges. Each bisector 7 intersects the center axis A1. Indentations 17, 17', 17" are formed between each pair of nose cutting edges 10, 10', 10". The first cutting edge 11 comprises a first sub-portion 111, a second sub portion 112, and a third sub-portion 113 between and connecting the first sub-portion 111 and the second sub portion 112. The first sub portion 111 adjoins the nose cutting edge 10. A distance from the nose cutting edge 10 to the first sub-portion 111 is shorter than a distance from the nose cutting edge 10) to the second sub-portion 112. As seen in FIG. 6, a distance from the first sub-portion 111 to the reference plane RP decreases at increasing distance from the nose cutting edge 10. In other words, the first sub-portion 111 slopes downwards in a side view, away from the nose cutting edge 10. A distance from the second sub-portion 112 to the reference plane RP increases at increasing distance from the nose cutting edge 10. In other words, the second sub-portion 112 slopes upwards in a side view away from the nose cutting edge 10. The third sub-portion 113 is concave in a side view as in FIG. 6. The third sub-portion 113 is the lowest portion of the first cutting edge 11 in a side view. The first and second cutting edges 11, 12 are symmetrical with respect to the bisector 7. Thus, the second cutting edge 12 comprises corresponding sub-portions as described for the first cutting edge 11.

Figure 7:
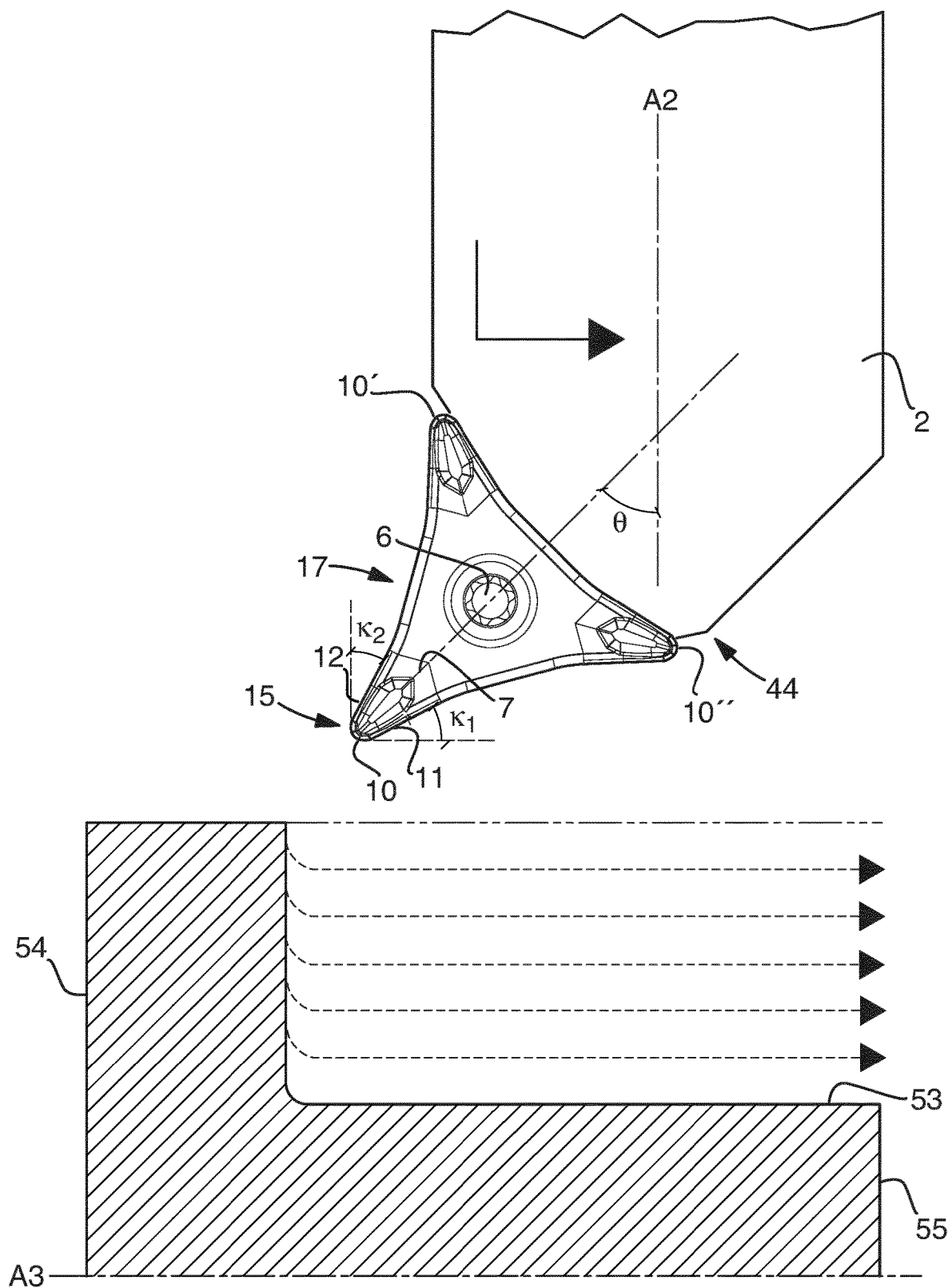
FIG. 7 is a schematic view illustrating turning of a cylindrical surface by a turning insert
Figure 8:
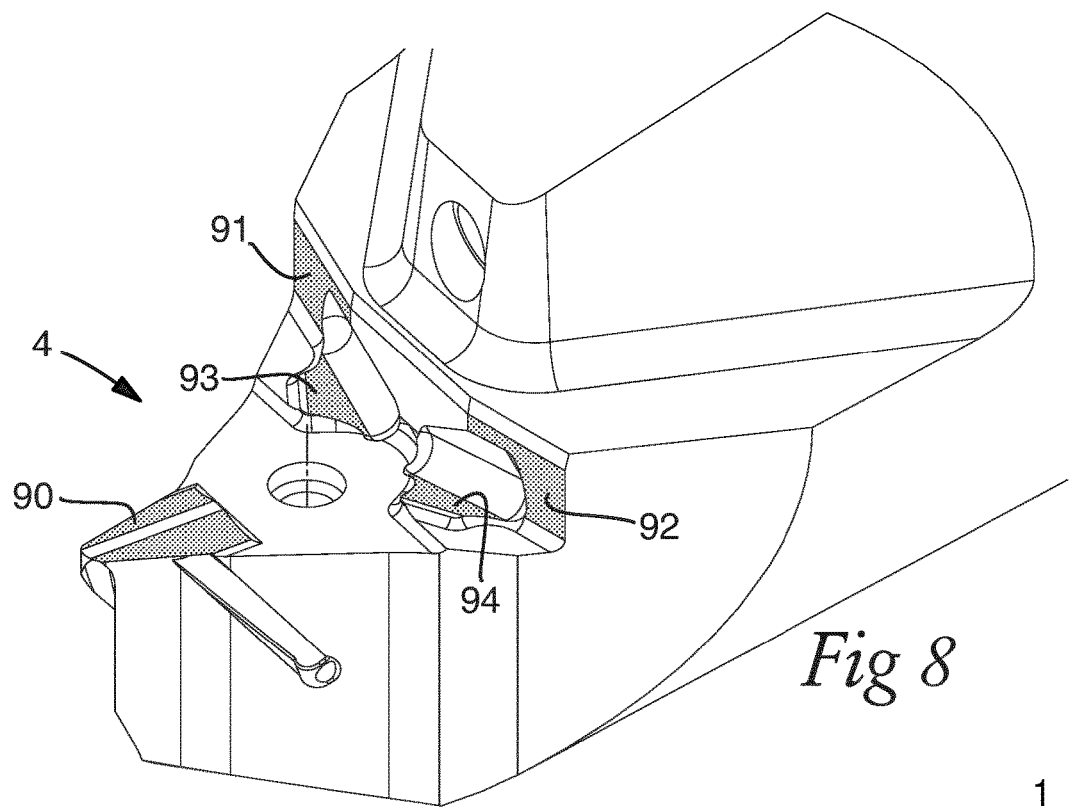
FIG. 8 is a perspective view showing a tool body for the turning insert in FIG. 1
Figure 9A:
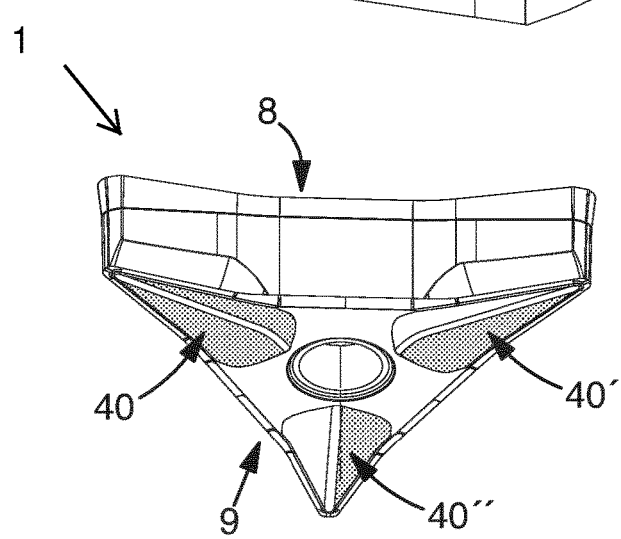
FIG. 9*a* is a perspective view showing the bottom surface of the turning insert in FIG. 1
Figure 9B:
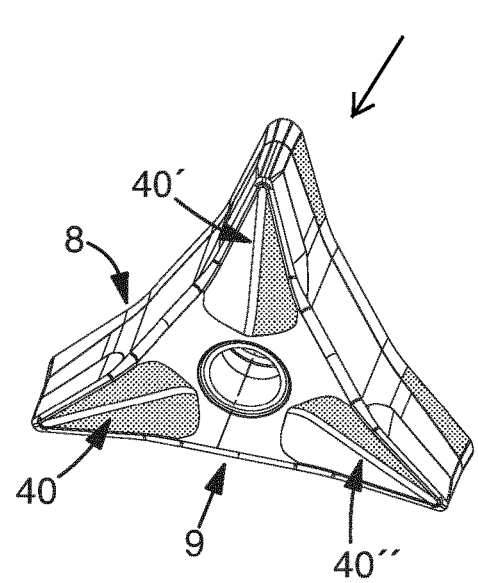
FIG. 9*b* is a further perspective view showing the bottom surface of the turning insert in FIG. 1

The bottom surface 9, seen in FIGS. 9*a* and 9*b*, comprises rotation prevention means, with the purpose of reducing the tendency for the turning insert 1 to rotate around the center axis A1 during cutting, in the form of three grooves 40, 40', 40", each groove 40, 40', 40" having a main extension in the same direction as the bisector 7 located adjacent the closest first 11 and second 12 cutting edges. Each groove 40, 40', 40" comprises two seating surfaces preferably at an obtuse angle, 100-160°, in relation to each other. The turning insert 1 is intended to be securely clamped, by clamping means such as a screw or a top clamp, in an insert seat 4 located at a front end of a tool body 2, as seen in FIG. 7. The contact between the insert seat 4 and the turning insert 1 will now be described, see the shaded areas in FIGS. 8, 9*a* and 9*b*. The active nose cutting portion 15 is the part of the insert where groove 40 is in FIG. 9*b*. The two seating surfaces of groove 40 are in contact with two surfaces of a ridge 90 in the bottom of the insert seat 4. One surface of each other groove 40', 40", the surfaces located at the largest distance from the active nose cutting edge 10, are in contact with bottom surfaces 93, 94 in the bottom of the insert seat 4. At least portions of the side surface 13 located at the greatest distance from the active nose cutting edge 10 may be in contact with rear seating surfaces 91, 92 formed at a rear end of the insert seat 4.

The top surface comprises a protrusion 30. The protrusion 30 comprises a first chip breaker wall 34 facing the first cutting edge 11 and a second chip breaker wall 35 facing the second cutting edge 12. The top surface 8 comprises a second protrusion 50 having an extension along the bisector 7, wherein the second protrusion 50 is between the nose cutting edge and the protrusion 30. In a side view, as seen in FIG. 6, a top surface of the second protrusion is lower than a top surface of the protrusion 30. As seen in e.g. FIG. 2, the second protrusion comprises a first chip breaker wall facing the first cutting edge 11 and a second chip breaker wall facing the second cutting edge 12.

In a side view, as seen in FIG. 6, a distance 61, measured in a plane perpendicular to the reference plane RP, between the top surface of the protrusion 30 and the lowest point of the first cutting edge 11 can be defined. Said distance 61 is 0.36-0.7 mm. 11. A distance 60, measured in a plane perpendicular to the reference plane RP, between the nose cutting edge 10 and the lowest point of the first cutting edge 11 can be defined, and is 0.05-0.4 mm.

The reference plane RP is located between and at equidistant length from the top and bottom 9 surfaces. Although the top and bottom surfaces are not flat, the reference plane RP can be positioned such that it is parallel to a plane intersecting the three nose cutting edges 10.

In a top view as seen in FIG. 3, the distance from the second sub-portion 112 to the first chip breaker wall 34 is decreasing away from the nose cutting edge 10. An angle A formed between an upper border line of the first chip breaker wall 34 and the second sub-portion 112 is 2-20°, even more preferably 5-15°.

A side surface 13 connects the top surface and the bottom surface 9. FIGS. 4 and 5 show sections along the lines B-B and C-C, respectively, in FIG. 3. The section C-C is perpendicular to the second cutting edge 12" in a plane perpendicular to the reference plane RP.

Indentations 17, 17', 17" are formed in each side surface 13 between each pair of nose cutting edges 10, 10', 10".

Reference is made to FIG. 7, which show a turning operation, using a turning tool comprising a turning insert 17. A metal work piece 50 is clamped by clamping means (not shown), which are connected to a machine (not shown) comprising a motor (not shown), such as a CNC-machine or a turning lathe. The clamping means preferably press against an external surface at a first end 54, or clamping end, of the metal work piece 50. An opposite second end 55 of the metal work piece 50 is a free end. The metal work piece rotates around a rotational axis A3. The turning insert, seen in top view, is securely and removably clamped in an insert seat or a pocket in tool body 2 by means of a screw 6. The tool body 2 has a longitudinal axis A2, extending between a rear end and a front end 44, in which the insert seat or pocket is located. In FIG. 7, the feed is, to a greatest extent, axial, also called longitudinal feed, i.e. the direction of the feed is parallel to the rotational axis A3. In this way, an external cylindrical surface 53 is formed. At the entry of each cut, or immediately prior to the axial feed, the feed has a radial component, in such a way that the turning insert move along an arc of a circle.

The turning insert comprises an active nose portion 15, comprising an active nose cutting edge 10. The active nose portion 15 further comprises an active first cutting edge which during axial turning parallel to the rotational axis A3 has an entering angle κ1 which is chosen to be in the range of 10–45°, preferably 20-40°. The first cutting edge, which is the main cutting edge in the operation, is ahead of the nose cutting edge 10 in the axial feed direction. In other words, the first cutting edge is a leading edge. A second cutting edge, formed on or at the active nose portion 15, is a secondary cutting edge or a trailing edge. If the feed direction would be radial, in such a way that the feed direction would be perpendicular to and away from the rotational axis A3, the second cutting edge would be active at an entering angle κ2. A bisector 7 is defined by the first and second cutting edges. In other words, the bisector is formed between the first and second cutting edges. The first and second cutting edges converge at a point outside the turning insert. The bisector of the active nose portion 15 forms an angle θ of 40-50°, relative to the longitudinal axis A2. The turning insert comprises two inactive nose portions, comprising two inactive nose cutting edges 10', 10". In the axial turning operation, all parts of the turning insert are ahead of the active nose cutting edge 10 in the feed direction. In the axial turning operation, chips can be directed away from the metal work piece in a trouble-free manner. In the machining step the turning insert 1 enters the metal work piece 50 such that the nose cutting edge 10 moves along an arc of a circle. The turning insert 1 enters the metal work piece 50, or goes into cut, such that the chip thickness during entry is constant or substantially constant. At the entry, the depth of cut is increased from zero depth of cut. Such preferred entry reduces the insert wear, especially the wear at the nose cutting edge 10. Chip thickness is defined as feed rate multiplied by entering angle. Thus, by choosing and/or varying the feed rate and the movement and/or direction of the turning insert during entry, the chip thickness can be constant or substantially constant. The feed rate during entry is preferably less than or equal than 0.50 mm/revolution. The chip thickness during entry is preferably less than or equal to the chip thickness during subsequent cutting or machining.

Figure 2:
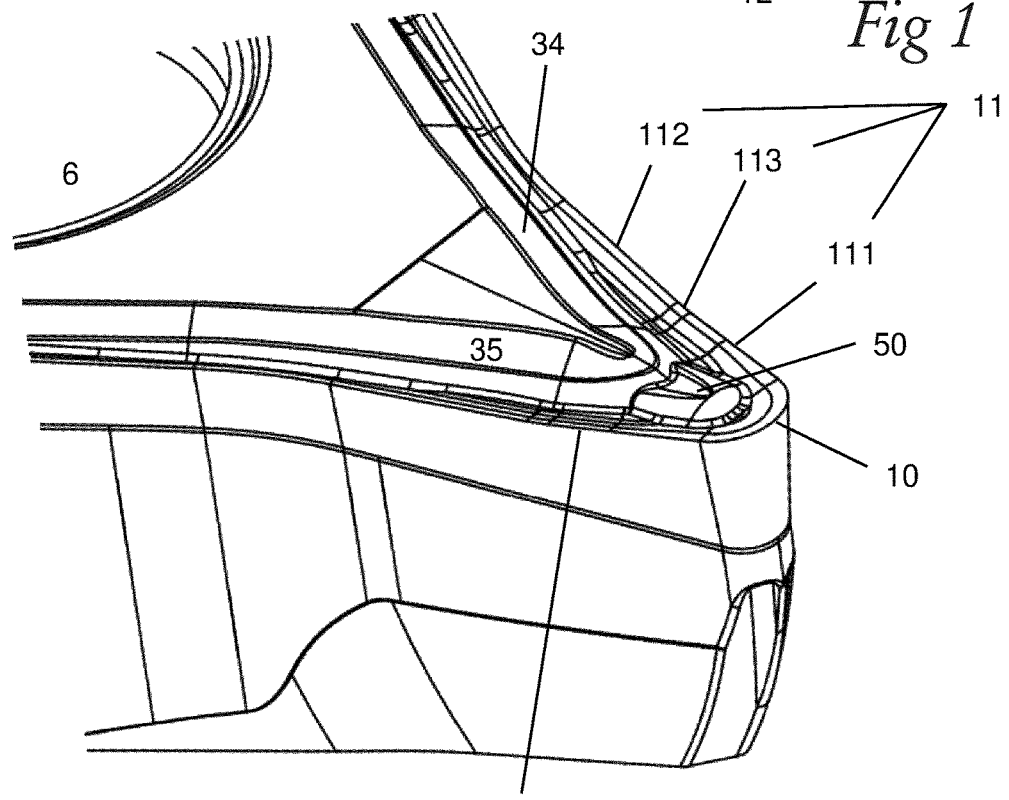
FIG. 2 is a perspective view of a nose portion of the turning insert shown in FIG. 1

The cylindrical surface 53, or rational symmetrical surface, generated or formed at least partly by the nose cutting edge in FIGS. 1 and 2, has a wavy shape with small peaks and valleys, and the wavy shape is influenced at least partly by the curvature of the nose radius and the feed rate. The wave height is less than 0.10 mm, preferably less than 0.05 mm. A thread profile is not a cylindrical surface 53 in this sense.

The turning insert in FIG. 7 is the turning insert shown in EP3153260A1. However, the turning insert according to the present invention is used in the same way.

Figure 10:
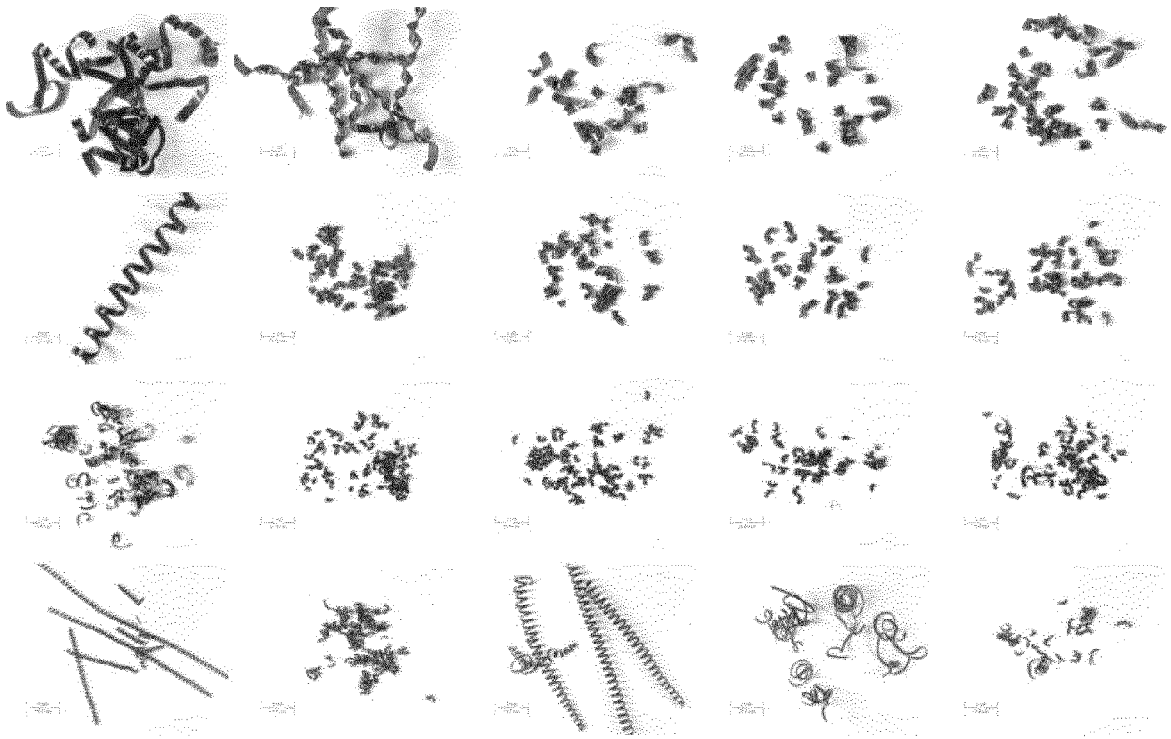
FIG. 10 is a chip chart showing chips from turning using the turning insert in FIG. 1
Figure 11:
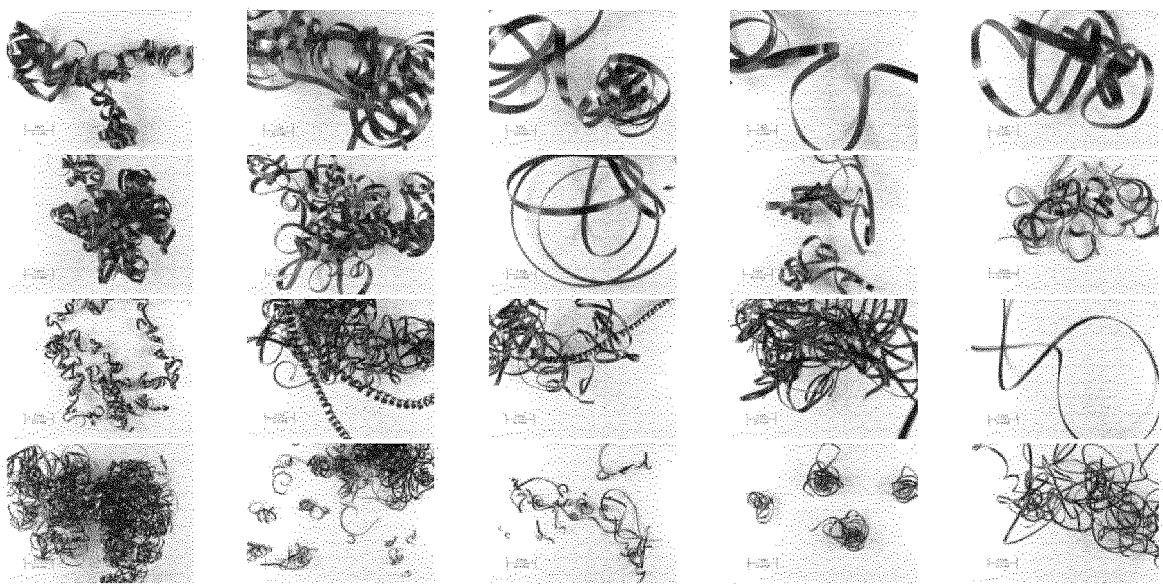
FIG. 11 is a chip chart showing chips from turning using a state of the art turning insert All turning insert figures have been drawn to scale.

FIGS. 10 and 11 show chip charts from turning, more specifically longitudinal turning where the entering angle of the first cutting edge is 30°, such as shown in FIG. 7, but without the arc-shaped entrance of cut. Chip charts have been made under identical conditions, where the work piece material is a carbon-manganese steel of type S355J2 in accordance with European standard EN 10025-2. In FIG. 10, the turning insert is according to the present invention, as seen in FIGS. 1-3, 6, 9a and 9b. In FIG. 11, the turning insert is from the state of the art, similar to or identical to the insert shown in FIGS. 16a-d in EP 3153260 A1.

Each of the chip charts show chips from 20 different cutting conditions. Horizontally is shown the feed rate in mm per revolution. From left to right: 0.1, 0.2, 0.3, 0.4, 0.5. Vertically is shown the depth of cut, i.e. the cutting depth, in mm. From bottom to top: 0.5, 1, 2, 3. As can be seen when comparing chips from corresponding conditions, the chips in FIG. 10 are typically shorter or of a more advantageous shape compared to the chips in FIG. 11.

According to a second embodiment (not shown), the top and bottom surfaces are identical. This means that while in a first position, the top surface 8 functions as a rake surface, when the insert is turned upside down, the same surface is now functioning as a seating surface. A reference plane is located parallel to and between the top surface and the bottom surface. A center axis extends perpendicular to the reference plane and intersects the reference plane, the top surface 8 and the bottom surface. A hole, for a screw, having openings in the top surface and the bottom surface is concentric with the center axis. The turning insert comprises side surfaces, functioning as clearance surfaces, connecting the top surface and the bottom surface. Three nose portions are formed symmetrically relative to or around the center axis. The nose portions are identical. Each nose portion comprises a first cutting edge, a second cutting edge and a convex nose cutting edge connecting the first and second cutting edges. The nose cutting edges are located at a largest distance from the center axis, i.e. at a larger distance from the center axis than all other parts of the turning insert. In a top view, the first and second cutting edges on or at the same nose portion forms a nose angle of 25-50° relative to each other. In a side view, the first and second cutting edges are formed in a corresponding manner as for the turning insert according to the first embodiment. The first and second cutting edges are linear or straight, or substantially linear or straight in a top view. Bisectors extend equidistantly from each pair of first and second cutting edges. Each bisector intersects the center axis. The turning insert comprises rotation prevention means in the form of a set of surfaces where each surface extends in a plane which forms an angle of 5-60° in relation to the reference plane. The set of surfaces are preferably formed as parts of a central ring-shaped protrusion, extending around the center axis, preferably as shown in FIGS. 13a-d in EP3153260A1. By such a configuration, the turning insert can be made double-sided or reversible, giving an increased possible usage.

The invention is not limited to the embodiments disclosed, but may be varied and modified within the scope of the following claims.

The invention claimed is:

1. A turning insert comprising:
   a top surface;
   an opposite bottom surface;
   side surfaces connecting the top surface and the bottom surface;
   a reference plane located parallel to and between the top surface and the bottom surface;
   a center axis extending perpendicular to the reference plane and intersecting the reference plane;
   three nose portions formed symmetrically around the center axis, each nose portion including a first cutting edge, a second cutting edge and a convex nose cutting edge connecting the first and second cutting edges, wherein in a top view the first and second cutting edges on the same nose portion form a nose angle of 25-50° relative to each other, wherein the first cutting edge includes a first sub-portion and a second sub-portion, wherein a distance from the nose cutting edge to the first sub-portion is shorter than a distance from the nose cutting edge to the second sub-portion, wherein a distance from the first sub-portion to the reference plane decreases at an increasing distance from the nose cutting edge, wherein, as seen in a side view, the first sub-portion slopes at an angle of 1-5°, wherein a distance from the second sub-portion to the reference plane increases at the increasing distance from the nose cutting edge, wherein, as seen in a side view, the second sub-portion slopes at an angle of 1-5°, and the bottom surface including rotation prevention means; and
   bisectors extending equidistantly from each pair of first and second cutting edges and wherein each bisector intersects the center axis, wherein the first and second cutting edges are symmetrical or substantially symmetrical relative to a respective bisector in respective side views.

2. The turning insert according to claim 1, wherein the first cutting edge includes a third sub-portion, wherein the third sub-portion is between the first sub-portion and the second sub-portion, and wherein the third sub-portion is concave in a side view.

3. The turning insert according to claim 2, wherein the third sub-portion is a lowest portion of the first cutting edge in a side view.

4. The turning insert according to claim 1, wherein the rotation prevention means are in the form of three grooves, each groove of the three grooves having a main extension along a bisector located between adjacent first and second cutting edges.

5. The turning insert according to claim 1, wherein the first and second cutting edges are linear or straight in a top view.

6. The turning insert according to claim 1, further comprising bisectors extending equidistantly from each pair of first and second cutting edges and wherein each bisector intersects the center axis, wherein the top surface includes a first protrusion having an extension along the bisector, the first protrusion including a first chip breaker wall facing the first cutting edge and a second chip breaker wall facing the second cutting edge.

7. The turning insert according to claim 6, wherein the top surface includes a second protrusion having an extension along the bisector, wherein the second protrusion of the top surface is between the nose cutting edge and the first protrusion, wherein in a side view, a top surface of the second protrusion is lower than a top surface of the first protrusion.

8. The turning insert according to claim 6, wherein a distance, measured in a plane perpendicular to the reference plane, between the top surface of the first protrusion and the lowest point of the first cutting edge is 0.36-0.7 mm.

9. The turning insert according to claim 6, wherein in a top view, the distance from the second sub-portion to the first chip breaker wall is decreasing away from the nose cutting edge.

10. The turning insert according to claim 1, wherein a distance, measured in a plane perpendicular to the reference plane, between the nose cutting edge and the lowest point of the first cutting edge is 0.05-0.4 mm.

11. A turning tool comprising:
    a turning insert according to claim 1; and
    a tool body, the tool body having a front end and an opposite rear end, a main extension along a longitudinal axis extending from the front end to the rear end, an insert seat formed in the front end in which the turning insert is mountable such that a bisector of an active nose portion forms an angle 35-55° in relation to the longitudinal axis of the tool body.

12. The turning tool according to claim 11, wherein the sum of the angle and half the nose angle α is equal or greater than 50°, and equal or smaller than 70°.

13. A method to machine a metal work piece with a turning insert according to claim 1, the method comprising the steps of:
    clamping the metal work piece at a first end;
    rotating the metal work piece around a rotational axis;
    positioning the first cutting edge of an active nose portion such that the first cutting edge forms a smaller angle relative to the rotational axis of the metal work piece than the angle formed by the second cutting edge relative to the rotational axis of the metal work piece; and
    moving the turning insert in a direction perpendicular to and away from the rotational axis such that the second cutting edge is active.

14. A method to machine a metal work piece with a turning insert according to claim 1, the method comprising the steps of:
    clamping the metal work piece at a first end;
    rotating the metal work piece around a rotational axis;
    positioning the first cutting edge of an active nose portion such that the first cutting edge forms a smaller angle relative to the rotational axis of the metal work piece than the angle formed by the second cutting edge relative to the rotational axis of the metal work piece; and moving the turning insert in a direction parallel to the rotational axis and away from the first end such that the first cutting edge is active.

\* \* \* \* \*